(12) United States Patent
Enomoto et al.

(10) Patent No.: US 12,643,188 B2
(45) Date of Patent: Jun. 2, 2026

---

(54) MACHINE TOOL AND DISPLAY CONTROL DEVICE

(71) Applicant: DMG MORI CO., LTD., Nara (JP)

(72) Inventors: Junjiro Enomoto, Hokkaido (JP); Megumi Oya, Hokkaido (JP); Shimpei Koda, Hokkaido (JP); Toshitaka Nagano, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 312 days.

(21) Appl. No.: 18/281,246

(22) PCT Filed: Jun. 16, 2022

(86) PCT No.: PCT/JP2022/024081
§ 371 (c)(1),
(2) Date: Sep. 8, 2023

(87) PCT Pub. No.: WO2023/276692
PCT Pub. Date: Jan. 5, 2023

(65) Prior Publication Data
US 2024/0149383 A1     May 9, 2024

(30) Foreign Application Priority Data
Jun. 28, 2021     (JP) ................................. 2021-106226

(51) Int. Cl.
G05B 19/409      (2006.01)
B23Q 15/12       (2006.01)
G06T 11/26       (2026.01)

(52) U.S. Cl.
CPC ........... B23Q 15/12 (2013.01); G05B 19/409 (2013.01); G06T 11/26 (2026.01); G05B 2219/36089 (2013.01); G06T 2200/24 (2013.01)

(58) Field of Classification Search
CPC .................. B23Q 15/12; G05B 19/409; G05B 2219/36089; G05B 19/404;
(Continued)

(56) References Cited

U.S. PATENT DOCUMENTS

2008/0289923 A1 *  11/2008  Suzuki .............. B23Q 17/0976
                                                         188/379
2011/0135415 A1    6/2011   Hamaguchi et al.
(Continued)

FOREIGN PATENT DOCUMENTS

JP        6456434 B      12/2018
JP        2019066944 A    4/2019

*Primary Examiner* — Christopher E. Everett
(74) *Attorney, Agent, or Firm* — IP Business Solutions, LLC

(57)     ABSTRACT

A display control device according to an embodiment controls display of a state of a machine tool that includes (i) an attachment portion to which a tool is attachable, (ii) a numerical control unit for controlling (a) movement of the attachment portion and (b) a rotating speed of the tool in accordance with a machining program and (iii) a vibration detection unit for detecting vibration of the tool. This display control device includes a display control unit for controlling display of time-series data indicating (i) a change in a vibration level detected by the vibration detection unit and (ii) a change in the rotating speed of the tool. Upon receiving an instruction to change the rotating speed, the display control unit controls the display so that a marker indicating the change instruction is superimposed on the time-series data.

6 Claims, 12 Drawing Sheets

(58) Field of Classification Search
CPC ........... G05B 2219/36091; G05B 2219/36171;
G05B 2219/37434; G05B 2219/41256;
G06T 11/206; G06T 2200/24
See application file for complete search history.

(56) References Cited

U.S. PATENT DOCUMENTS

| | | | |
|---|---|---|---|
| 2012/0093598 A1 | 4/2012 | Ando et al. | |
| 2012/0095724 A1* | 4/2012 | Ando | B23Q 17/12 |
| | | | 702/145 |
| 2016/0116899 A1* | 4/2016 | Piner | B23Q 11/0039 |
| | | | 700/173 |
| 2016/0288285 A1* | 10/2016 | Piner | B23Q 17/0976 |
| 2016/0346891 A1 | 12/2016 | Ando | |
| 2019/0094835 A1* | 3/2019 | Okamura | G05B 19/401 |
| 2020/0070295 A1* | 3/2020 | Uenishi | B23Q 17/12 |

* cited by examiner

MACHINE TOOL AND DISPLAY CONTROL DEVICE

TECHNICAL FIELD

The present invention relates to a display control technology for supporting countermeasures to chatter vibration occurring in machine tools.

BACKGROUND ART

Chatter vibration occurring in machine tools leads to quality deterioration of a machined surface of a workpiece. Therefore, it is important to suppress occurrence of chatter vibration. There are a variety of causes of occurrence of chatter vibration. A vibration source may be a tool or a workpiece. An operator takes an action on the basis of one's own experience to find and remove the cause in many cases. For example, the operator listens to the vibration sound and observes the machined surface of the workpiece to presume the cause of occurrence of chatter vibration, and adjusts a spindle rotating speed, a spindle feed rate, or a depth or width of cut of the tool, for example. When the chatter vibration does not converge after the above adjustment, the operator attempts to change a method of fixing the workpiece or to change the tool. The countermeasures are selected on the basis of one's own experience and knowledge.

There are several factors of chatter vibration. Major factors are regenerative chatter resulting from a change in thickness of cut of the tool caused by undulations of the machined surface due to vibration and forced chatter caused by resonance based on a natural frequency. A technology has been proposed which supports an operation to be made by the operator to converge chatter vibration when the chatter vibration occurs (see Patent Literature 1).

CITATION LIST

Patent Literature

PTL 1: JP 6456434 A

SUMMARY OF INVENTION

Technical Problem

It is desirable that the operator records an operation in detail in order to enable ex-post determination whether the countermeasure to the chatter vibration taken by the operator has been effective and to know ex-post facto what kind of operation has been performed when the countermeasure has been effective. This record can efficiently cause subsequent chatter vibration to converge more easily. However, it is not easy for the operator to record the operation while operating a machine tool. In particular, since feature values such as the magnitude and frequency of chatter vibration change from moment to moment during machining, a time lag may arise between the operation content and the operation timing in a method in which the operator manually records the operation.

Solution to Problem

An embodiment of the present invention is a display control device for controlling display of a state of a machine tool including (i) an attachment portion to which a tool is attachable, (ii) a numerical control unit for controlling (a) movement of the attachment portion and (b) a rotating speed of the tool in accordance with a machining program and (iii) a vibration detecting portion for detecting vibration of the tool. The display control device includes: a display control unit for controlling display of time-series data indicating (i) a change in a vibration level detected by the vibration detecting portion and (ii) a change in the rotating speed of the tool. Upon receiving an instruction to change the rotating speed, the display control unit controls the display so that a marker indicating the change instruction is superimposed on the time-series data.

Another embodiment of the present invention is a machine tool. The machine tool includes: an input unit for receiving input of an operation of an operator; an attachment portion to which a tool is attachable; a numerical control unit for controlling movement of the attachment portion and a rotating speed of the tool in accordance with a machining program; a vibration detection unit for detecting vibration of the tool; and a display control unit for controlling display of time-series data indicating a change in a vibration level detected by the vibration detection unit and a change in the rotating speed of the tool. Upon receiving an instruction to change the rotating speed from the input unit, the display control unit displays a marker indicating a timing of the change instruction so that the marker is superimposed on the time-series data.

Advantageous Effects of Invention

According to the present invention, it is possible to provide display that supports countermeasures to chatter vibration to be taken by an operator during use of a machine tool.

DESCRIPTION OF EMBODIMENTS

An embodiment of the present invention will now be described below with reference to the drawings.

Figure 1:
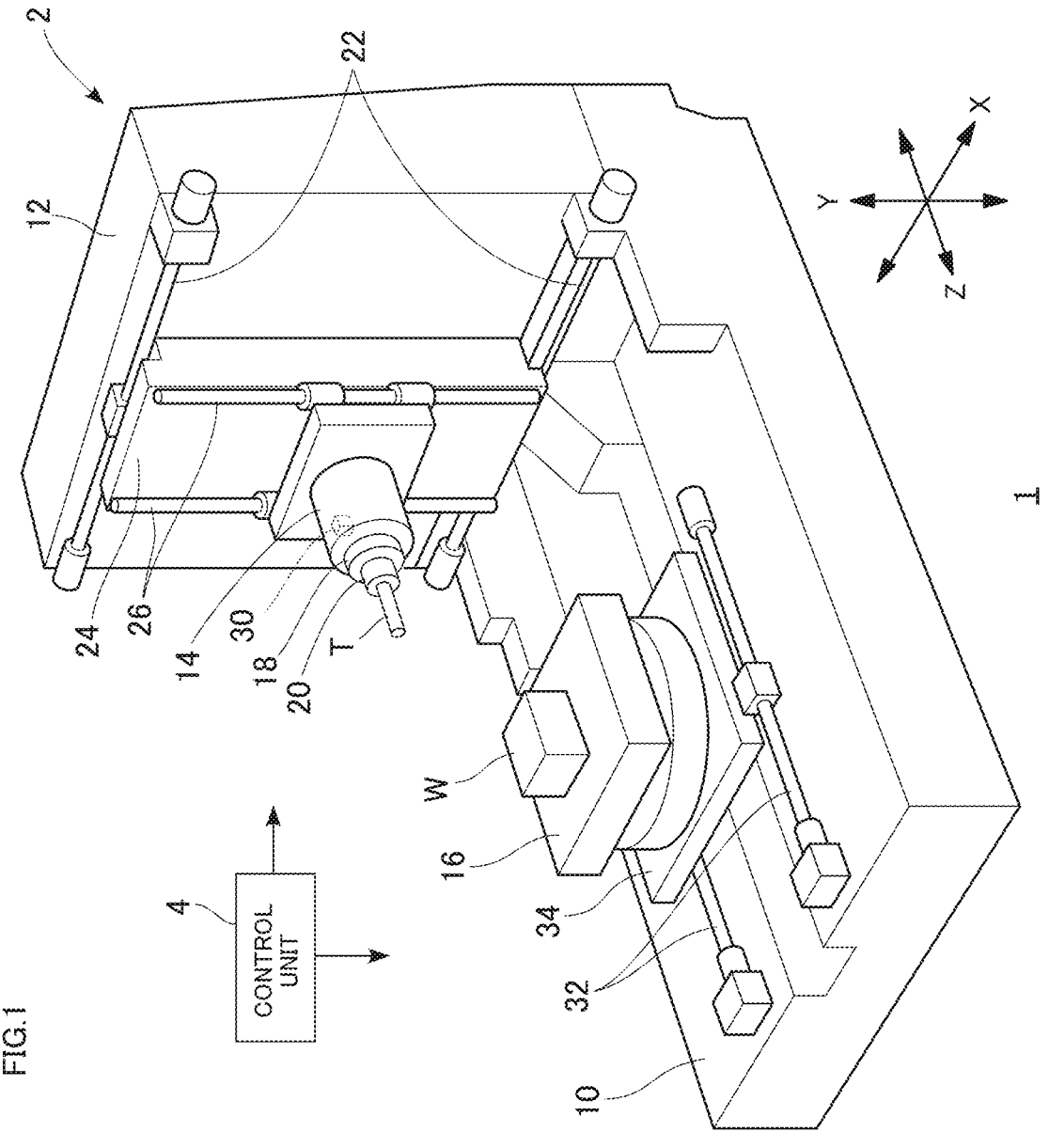
FIG. 1 is a perspective view illustrating a schematic configuration of a machine tool according to an embodiment.

FIG. 1 is a perspective view illustrating a schematic configuration of a machine tool according to an embodiment. Here, the left-right direction, the up-down direction, and the front-back direction when a machine tool 1 is viewed from the front are referred to as an X-axis direction, a Y-axis direction, and a Z-axis direction, respectively.

The machine tool 1 is a horizontal machining center and includes machining equipment 2 and a control unit 4. A housing (not illustrated) is provided to cover the machining equipment 2. A console is provided on a side surface of the housing. The console includes a touch panel (described later) that can be operated by an operator.

The machining equipment 2 includes a bed 10, a column 12 provided to stand on the bed 10, a spindle head 14 movably provided on the front surface side of the column 12, and a table 16 movably provided on the bed 10. The spindle head 14 has an axis in the Z-axis direction and supports a spindle 18 to allow the spindle 18 to rotate around the axis. The spindle head 14 is provided with a spindle motor for rotatively driving the spindle 18. The spindle 18 functions as an "attachment portion" to which a tool T held by a tool holder 20 can be coaxially attached. A workpiece W is fixed onto the table 16 via a jig (not illustrated).

Guiderails 22 are provided on the front surface of the column 12 and a saddle 24 is supported by the guiderails 22 to be movable in the X-axis direction. The saddle 24 is provided with guiderails 26 on its front surface which support the spindle head 14 in such a manner that the spindle head 14 can move in the Y-axis direction. Movement of the saddle 24 and the spindle head 14 is realized by a feed mechanism and a servo motor driving the feed mechanism (both not illustrated). The feed mechanism is, for example, a screw feed mechanism using a ball screw. The saddle 24 and the spindle head 14 are driven to move the spindle 18 in the X and Y-axis directions. The spindle head 14 has an acceleration sensor (accelerometer) 30 incorporated therein. The acceleration sensor 30 is used for detecting chatter vibration of the tool T and will be described in detail later.

Meanwhile, guiderails 32 are provided on the top surface of the bed 10. A saddle 34 is supported by the guiderails 32 to be movable in the Z-axis direction. The table 16 is fixed on the saddle 34. Movement of the saddle 34 is realized by a feed mechanism and a servo motor driving the feed mechanism (both not illustrated). The feed mechanism is, for example, a screw feed mechanism using a ball screw. The saddle 34 is driven to move the workpiece W in the Z-axis direction. That is, the configuration described above can adjust relative positions of the workpiece W and the tool T to each other three-dimensionally.

Figure 2:
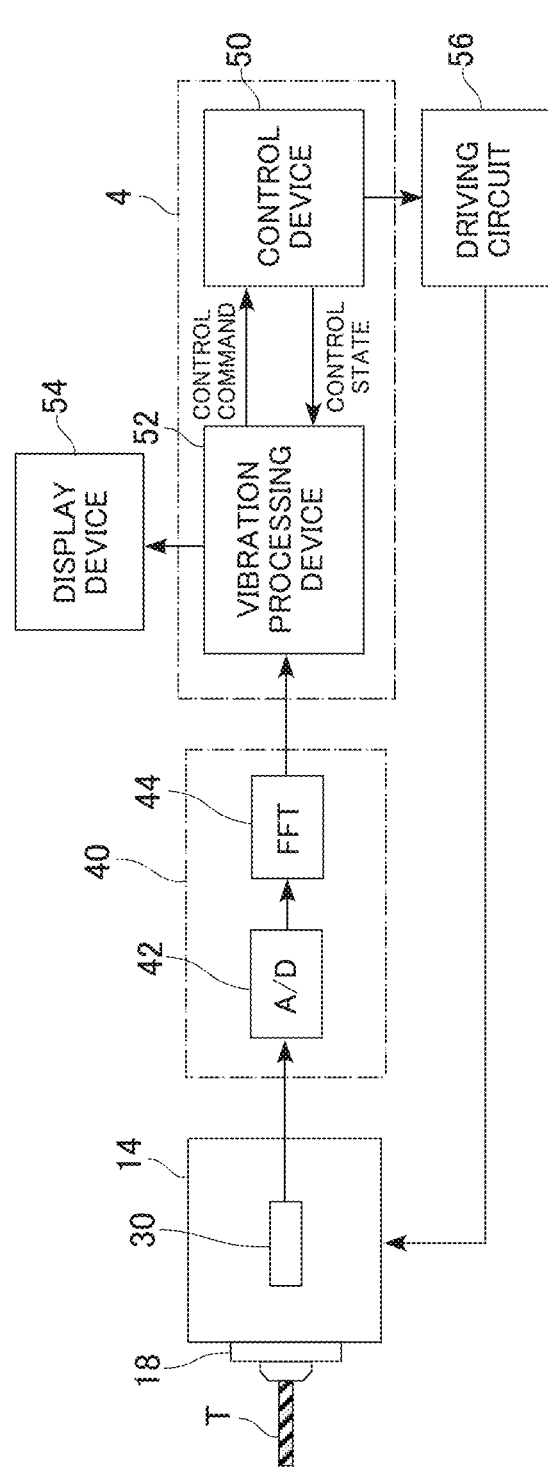
FIG. 2 is a diagram schematically illustrating an electrical configuration of functional units involved in detection of chatter vibration.

FIG. 2 is a diagram schematically illustrating an electrical configuration of functional units involved in detection of chatter vibration.

The spindle head 14 has the acceleration sensor 30 incorporated therein as described above. The acceleration sensor 30 detects vibration occurring in the tool T during machining of the workpiece W and outputs a signal depending on the vibration. The acceleration detected by the acceleration sensor 30 (in more detail, the electrical signal representing the acceleration) is input to a signal processing device 40.

The signal processing device 40 is configured by an A/D converter 42 and a frequency analyzing device 44 that are mounted on a dedicated board. For the signal output from the acceleration sensor 30, AD conversion is performed by the A/D converter 42, and FFT (fast Fourier transform) is performed by the frequency analyzing device 44. The resultant information is output to the control unit 4.

The control unit 4 includes a control device 50 and a vibration processing device 52. A display device 54 is connected to the control unit 4. The display device 54 is a touch panel provided on a console and displays a screen indicating a control state of the machine tool 1 and an operation screen to be operated by an operator.

The vibration processing device 52 receives information indicating a control state from the control device 50 and outputs a control instruction according to input of an operation by the operator to the control device 50. The vibration processing device 52 performs predetermined processing related to chatter vibration on the basis of the signal received from the signal processing device 40 and the signal received from the control device 50.

The vibration processing device 52 causes a screen (a status screen) indicating a vibration state of the spindle 18 (that is, a vibration state of the tool T) to be displayed on the basis of the signal input from the signal processing device 40 and determines whether chatter vibration has occurred. Upon determining that chatter vibration has occurred, the vibration processing device 52 causes an operation screen (a tuning screen) for causing the chatter vibration to converge to be displayed. These processes will be described in detail later.

The control device 50 controls an actuator, such as a motor, in accordance with a machining program (an NC program) manually or automatically created. When turning is performed for the workpiece W, the control device 50 drives a servo motor via a driving circuit 56 to feed-drive the spindle head 14. The control device 50 also drives a spindle motor via the driving circuit 56 to rotate the spindle 18.

Figure 3:
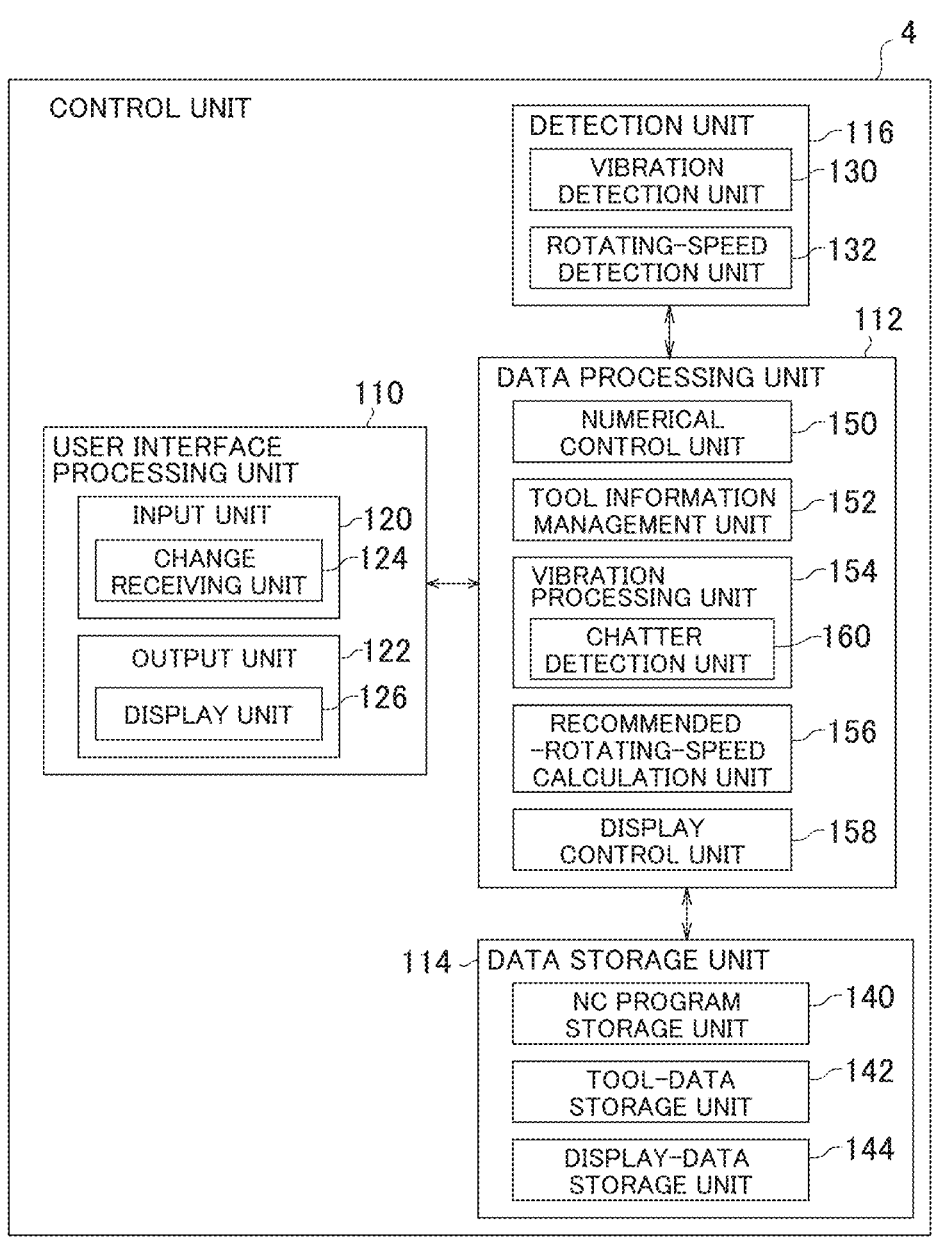
FIG. 3 is a functional block diagram of a control unit.

FIG. 3 is a functional block diagram of the control unit 4.

The components of the control unit 4 are implemented by hardware including computing units such as central processing units (CPUs) and various computer processors, storage devices such as memories and storages, and wired or wireless com-munication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks to be described below do not refer to configurations in units of hardware but to blocks in units of functions.

The control unit 4 includes a user interface processing unit 110, a data processing unit 112, a data storage unit 114, and a detection unit 116. The user interface processing unit 110 performs processes related to user interfaces such as receiving operations input by an operator, displaying images, and outputting audio. The data processing unit 112 performs various processes on the basis of data obtained by the user interface processing unit 110, information detected by the detection unit 116, and data stored in the data storage unit 114. The data processing unit 112 also functions as an interface of the user interface processing unit 110, the detection unit 116, and the data storage unit 114. The data storage unit 114 stores various programs and set data therein.

The user interface processing unit 110 includes an input unit 120 and an output unit 122. The input unit 120 receives input made by the operator via a touch panel or a hardware device such as a handle. The input unit 120 includes a change receiving unit 124. The change receiving unit 124 receives a change instruction by the operator, for example, an instruction to change a rotating speed or a feed speed of the spindle 18.

The output unit 122 provides the operator with various kinds of information by image display or audio output. The output unit 122 includes a display unit 126. The display unit 126 may cause a panel (a keyboard and a machine operation panel) to be displayed as an operation screen on the display device 54. The display unit 126 displays a status screen indicating a state (a control state and a vibration state) of the spindle 18 and, when chatter vibration has occurred, displays the above-described tuning screen (described later in detail).

The detection unit 116 includes a vibration detection unit 130 and a rotating-speed detection unit 132. The vibration detection unit 130 detects vibration of the spindle 18 (that is, vibration of the tool T) on the basis of a sensor output from the acceleration sensor 30 and acquires information output from the signal processing device 40. The rotating-speed detection unit 132 detects the rotating speed of the spindle 18 (that is, the rotating speed of the tool T) on the basis of a sensor output of a rotary encoder (not illustrated) attached to the spindle 18.

The data storage unit 114 includes an NC program storage unit 140, a tool-data storage unit 142, and a display-data storage unit 144. The NC program storage unit 140 stores a machining program (an NC program) therein. The tool-data storage unit 142 stores therein information on the tool T to be used in the machine tool 1 (tool information) in association with a tool ID. The tool information includes, for example, a tool type, a tool diameter, and the number of cutting edges. A range in which a spindle rotating speed can be adjusted by the vibration processing device 52 (hereinafter, an "adjustable range") is also associated with the tool information. The display-data storage unit 144 stores therein data of screens to be displayed by the display unit 126 and data of various images including soft keys, a dialog box, and the like to be displayed on the screens.

The data processing unit 112 includes a numerical control unit 150, a tool information management unit 152, a vibration processing unit 154, a recommended-rotating-speed calculation unit 156, and a display control unit 158. The numerical control unit 150 includes the function of the control device 50. The numerical control unit 150 controls the machining equipment 2 on the basis of a command input from the input unit 120 in accordance with a machining program stored in the data storage unit 114.

The numerical control unit 150 also transmits information indicating a current state of control by the control device 50 (control information) to the vibration processing unit 154 sequentially. The numerical control unit 150 transmits, for example, a control command value of a spindle rotating speed (hereinafter, also a "control-command spindle rotating speed").

The tool information management unit 152 manages information on the tool T (tool information) stored in the tool-data storage unit 142 in association with a tool ID.

The vibration processing unit 154 includes a chatter detection unit 160 as the function of the vibration processing device 52. The frequency analyzing device 44 described above receives a signal continuously output from the acceleration sensor 30 and analyzes the signal by Fourier analysis (frequency analysis) at a predetermined sampling interval, thereby calculating a frequency of vibration occurring in the tool T (a "vibration frequency") and the magnitude of that vibration (also referred to as "vibration level"). The chatter detection unit 160 acquires information including the vibration level and the vibration frequency and, when the vibration level has exceeded a predetermined threshold, determines that chatter vibration has occurred.

Although a configuration example in which the frequency analyzing device 44 is provided in the signal processing device 40 (see FIG. 2) to be separate from the control unit 4 has been described in the present embodiment, the function of the frequency analyzing device 44 may be included in the vibration processing unit 154 as a "frequency analysis unit" in a modification. Further, the signal processing device 40 may be included in the control unit 4 as a part thereof.

When chatter vibration has occurred, the recommended-rotating-speed calculation unit 156 calculates a preferable speed to which the spindle rotating speed is to be changed (also referred to as a "recommended rotating speed") in order to cause this chatter vibration to converge. The recommended rotating speed can be calculated by, for example, a method described in JP 2018-176296 A.

Specifically, when detected chatter vibration is regenerative chatter, a recommended rotating speed SS (a recommendation value) can be calculated by the following Expression (1) on the basis of a vibration frequency $\Omega 0$ (a chatter frequency) at that time and the number n of cutting edges of the tool T.

$$SS=(60\times\Omega 0)/(n\times k) \ldots \tag{1}$$

where k is a given integer equal to or greater than 1.

The recommended rotating speed SS is a rotating speed corresponding to the k-th order stability pocket in a stability limit diagram. Chatter vibration may be able to be eliminated by adjusting the spindle rotating speed to the recommended rotating speed SS. When the recommended rotating speed SS that is obtained by Expression (1) described above when k is set to, for example, 2 with respect to the spindle rotating speed S0 at which the chatter vibration has occurred is within a stability region, the chatter vibration can be eliminated by changing the spindle rotating speed from S0 to SS.

The number n of cutting edges of the tool T can be acquired on the basis of the tool ID of the tool T that is currently being used. The tool information management unit 152 refers to the tool-data storage unit 142 on the basis of that tool ID and acquires the number n of cutting edges. The recommended-rotating-speed calculation unit 156 calculates a first recommendation value higher than a current control-command spindle rotating speed and a second recommendation value lower than the current control-command spindle rotating speed as recommended rotating speeds to be presented to an operator.

The display control unit 158 controls display by the display unit 126. The display control unit 158 causes the display unit 126 to display a screen indicating a state of control by the control device 50 (a status screen and the like) and a screen for monitoring occurrence of chatter vibration (a tuning screen and the like).

The vibration processing unit 154, the recommended-rotating-speed calculation unit 156, the display control unit 158, the change receiving unit 124, and the display unit 126 serve as a "display control device" that controls display of an operating state of the machine tool 1.

Next, processing involved in detecting occurrence of chatter vibration and suppressing the chatter vibration is specifically described.

Figure 4:
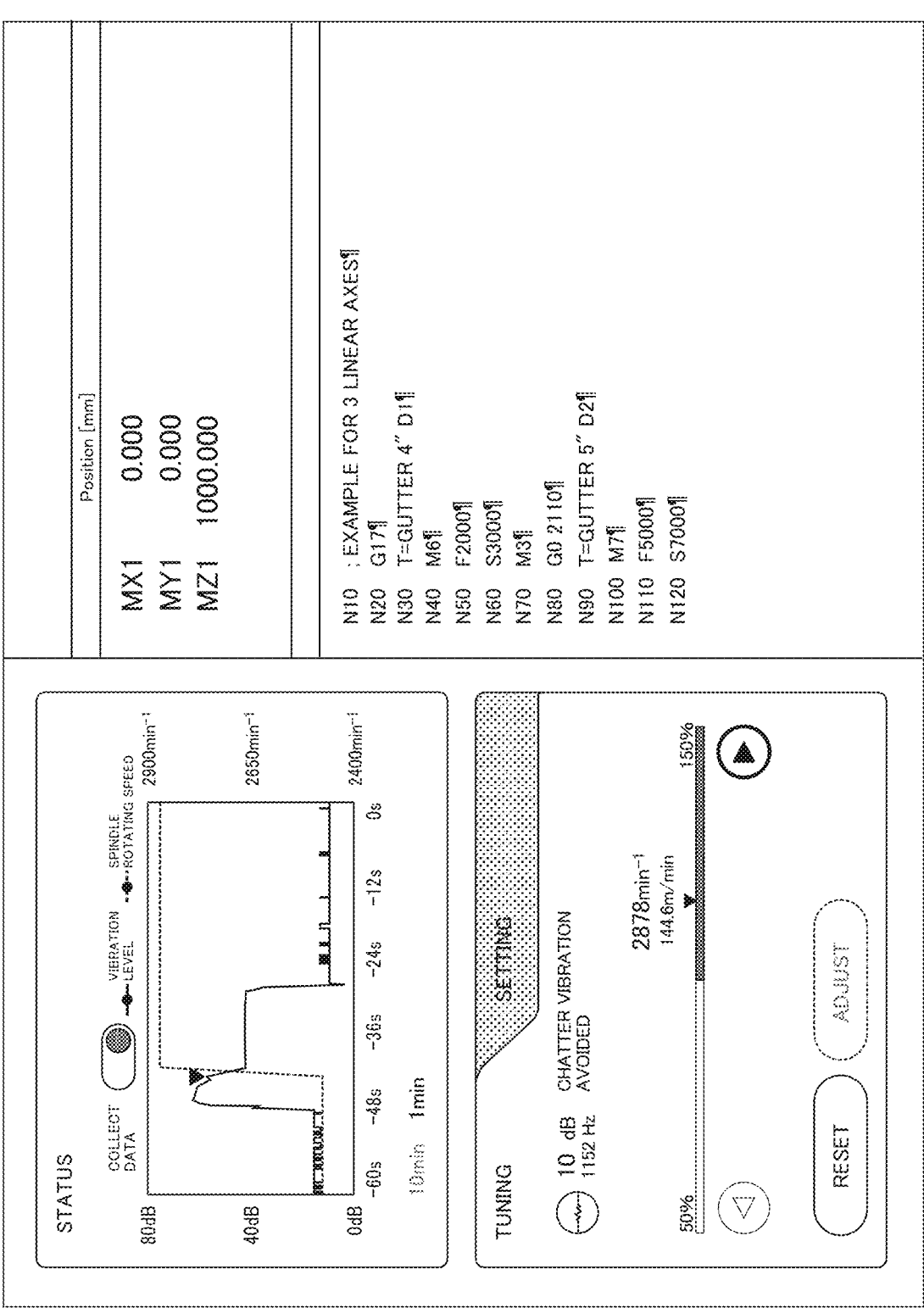
FIG. 4 is a diagram illustrating a management screen for managing a state of control by a control device.

FIG. 4 is a diagram illustrating a management screen for managing a state of control by the control device 50.

A running NC program is displayed in a right region on this management screen. A status screen is displayed in an upper left region. A tuning screen is displayed in a lower left region. These displays use data stored in the display-data storage unit 144.

Figure 5A:
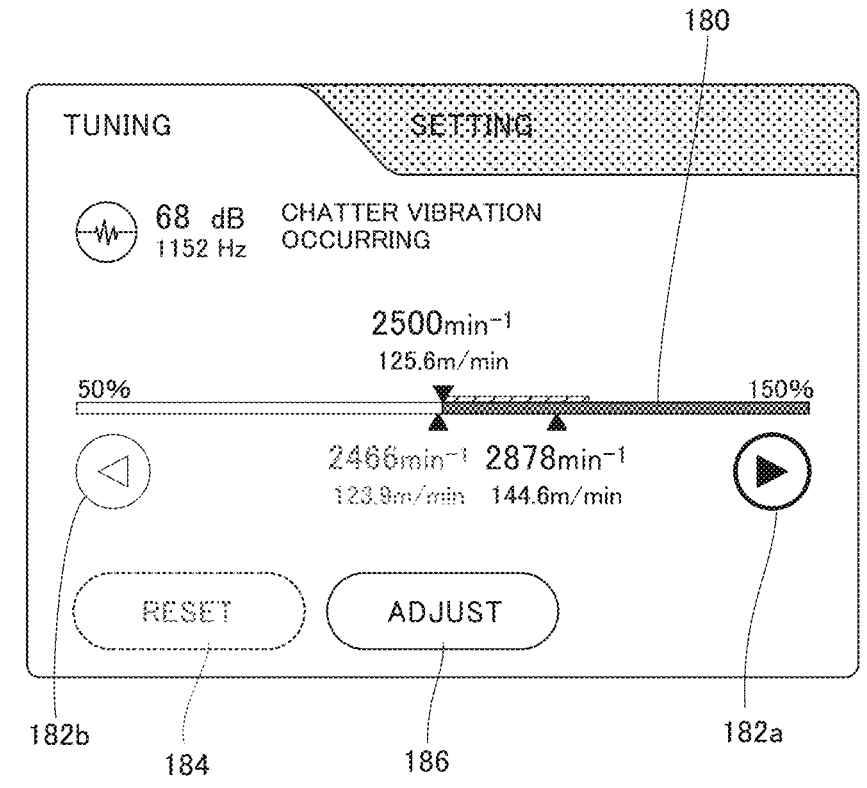
FIG. 5A is a diagram illustrating a tuning screen and a status screen.
Figure 5B:
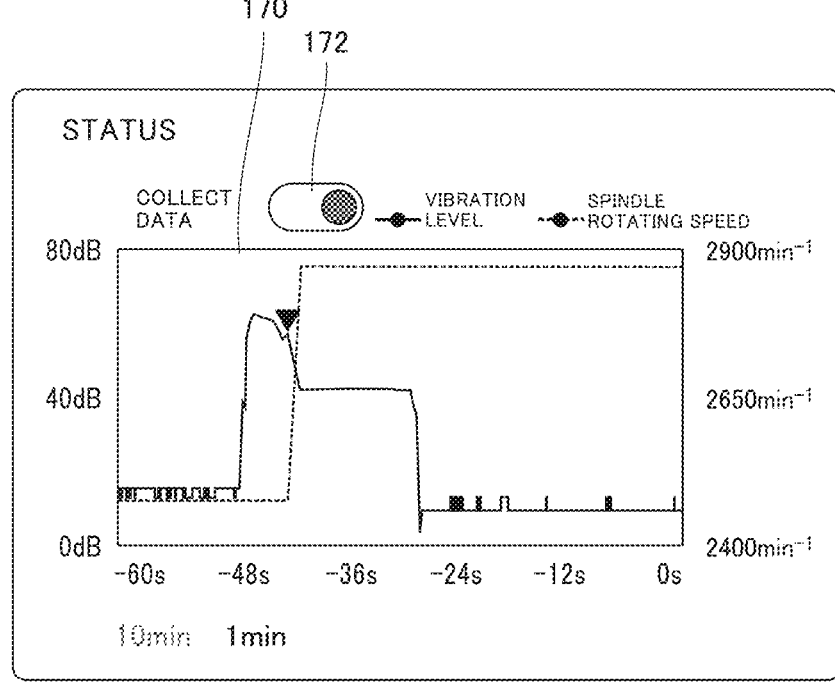
FIG. 5B is a diagram illustrating a tuning screen and a status screen.

FIGS. 5A and 5B are diagrams illustrating a tuning screen and a status screen. FIG. 5A illustrates an example of the tuning screen, and FIG. 5B illustrates an example of the status screen.

As illustrated in FIG. 5A, an override bar 180 for indicating a spindle rotating speed is displayed in a central region on the tuning screen. The override bar 180 is a scale object (an object having a scale function) extending to the left and right on the screen. The center of the override bar 180 indicates a position at which a program-command spindle rotating speed is 100%. Here, the "program-command spindle rotating speed" is a spindle rotating speed specified by a machining program. The program-command spindle rotating speed does not change until a new value is commanded on the program. A current control-command spindle rotating speed (2500 $min^{-1}$ in the illustrated example) is displayed above the override bar 180. The control-command spindle rotating speed is a spindle rotating speed commanded by a PLC.

At start of the tuning screen, the control-command spindle rotating speed is displayed above the center of the override bar 180 because the program-command spindle rotating speed and the control-command spindle rotating speed are equal to each other. When the spindle rotating speed is changed by the vibration processing device 52, the display position of the control-command spindle rotating speed is changed depending on a ratio of the change. While normal control is executed, an actual spindle rotating speed detected by the above-described rotary encoder (also referred to as an "actual spindle rotating speed") is substantially coincident with the control-command spindle rotating speed.

The right end of the override bar 180 is a position indicating 150% (that is, +50%) of the program-command spindle rotating speed, and the left end thereof is a position indicating 50% (that is, −50%) of the program-command spindle rotating speed. That is, the override bar 180 corresponds to a "ratio display unit" that indicates a ratio of a change in the control-command spindle rotating speed to the current program-command spindle rotating speed.

A vibration level and a peak frequency currently detected are displayed in an upper region on the tuning screen. The "peak frequency" means a vibration frequency at which the vibration level is the highest currently. A vibration level of 68 (dB) and a peak frequency of 1152 (Hz) are displayed in the illustrated example. Further, since chatter vibration has been determined as having occurred from this vibration level, a character string "chatter vibration occurs" notifying the occurrence is displayed.

When chatter vibration has been detected, the recommended-rotating-speed calculation unit 156 calculates two recommended rotating speeds for causing the chatter vibration to converge (the first recommendation value and the second recommendation value), as described above. The display control unit 158 causes the two recommendation values thus calculated to be displayed on the tuning screen. In the illustrated example, "2878 $min^{-1}$" and "2466 $min^{-1}$" are displayed as the first recommendation value and the second recommendation value, respectively, below the scale along the scale.

Symbol ▼ indicating a position of the control-command spindle rotating speed and its numerical value (2500 $min^{-1}$) are displayed at a position corresponding to a ratio of the control-command spindle rotating speed to the program-command spindle rotating speed in the override bar 180.

Symbol ▲ indicating a position of the first recommendation value and its numerical value (2878 $min^{-1}$) are displayed at a position corresponding to a ratio of the first recommendation value to the program-command spindle rotating speed in the override bar 180. Similarly, symbol ▲ indicating a position of the second recommendation value and its numerical value (2466 $min^{-1}$) are displayed at a position corresponding to a ratio of the second recommendation value to the program-command spindle rotating speed in the override bar 180.

A numerical value (m/min) under each spindle rotating speed represents the peripheral speed (m/min) of a tool and is calculated by the following Expression (2).

$$\text{Peripheral speed[m/min]} = \text{spindle rotating speed}[min^{-1}] \times \pi \times (\text{tool diameter } [mm]/1000) \ldots \quad (2)$$

This "peripheral speed" is an index of a tool load.

However, since one of the first and second recommendation values is set to be selectable by presetting performed by the operator as described later, the non-selectable recommendation value is grayed out. The presetting of the recommendation value can be performed by switching select buttons 182a and 182b that will be described later. The detailed description of the switching is omitted.

The tuning screen is an operation screen having a touch panel function, on which a plurality of kinds of buttons selectable by the operator are displayed. The select buttons 182a and 182b for selecting a method of setting the recommendation values are displayed a little below the right and left ends of the override bar 180, respectively. A reset button 184 and an adjust button 186 are displayed in a lower region on the tuning screen. The adjust button 186 serves as an "instruction input unit" that receives a speed change command for the spindle rotating speed. The reset button 184 serves as a "reset command input unit" that receives a command to reset the control-command spindle rotating speed to the program-command spindle rotating speed.

However, for each of the reset button 184 and the adjust button 186, determination whether to display that button is made in the course of the processing by the vibration processing unit 154. When the button is selectable, it is displayed normally (also referred to as "displayed as being active"). When the button is non-selectable, it is grayed out. The adjust button 186 is displayed as being active when the selected recommendation value is within a preset adjustable range.

In the illustrated example, the first recommendation value is selected in the presetting, and the select button 182a is displayed as being active. Since chatter vibration has occurred in this state, the second recommendation value is grayed out. In addition, since the selected first recommendation value is within the adjustable range, the adjust button 186 is displayed as being active. The operator can give an instruction to change the control-command spindle rotating speed (2500 $min^{-1}$) to the recommended rotating speed (the first recommendation value: 2878 $min^{-1}$) by tapping (selecting) the adjust button 186 in this state.

The adjustable range of the spindle rotating speed is set to a range from 50% to 150% (that is, within ±50%) of the program-command spindle rotating speed, as illustrated in FIG. 5A in the present embodiment. This setting prevents a rapid change of the rotating speed (the control state) of the spindle 18 which is unexpected for the operator.

The vibration processing unit 154 outputs an instruction to change the spindle rotating speed to the numerical control unit 150 in response to an input made by the operator. In response to this change instruction, the numerical control unit 150 changes a control command value of the spindle rotating speed (that is, the control-command spindle rotating speed).

The status screen in FIG. 5B illustrates an example of a result of the change of the control-command spindle rotating speed in accordance with presentation of the recommended rotating speed by the tuning screen in FIG. 5A. This status screen is a default status screen (a first status screen). A sampling screen 170 is displayed at the center on the status screen, in which the horizontal axis represents elapsed time and the vertical axis represents a vibration level and a spindle rotating speed. The sampling screen 170 is a real-time chart that displays a change in the vibration level and a change in the spindle rotating speed in real time. A solid line represents the change in the vibration level (dB), and a dotted line represents the change in the control-command spindle rotating speed ($\text{min}^{-1}$). Symbol ▼ in the chart is a marker indicating a timing of switching of the control-command spindle rotating speed in accordance with an input of an operation (a change instruction) by an operator.

This status screen is also an operation screen having a touch panel function and allows selection of either a pattern in which the scale of the horizontal axis in the sampling screen 170 is up to 10 min or a pattern in which that scale is up to 1 min (60 s). The latter pattern is selected in the illustrated example. A current time is indicated by "0 s" at the right end of the screen. A previous sampling history is continuously displayed on the left side. The sampling screen 170 is displayed in real time by turning on a collect data button 172 at an upper left position on the screen.

The display control unit 158 controls display of time-series data indicating the change in the vibration level detected by the vibration detection unit 130 and the change in the spindle rotating speed (that is, the rotating speed of the tool T) as this status screen. Upon receiving the instruction to change the spindle rotating speed by an input of an operation by the operator, the display control unit 158 causes the marker ▼ indicating the timing of the change instruction to be displayed on the time-series data in a superimposing manner.

In the illustrated example, machining in a predetermined block has started at a control-command spindle rotating speed of 2500 $\text{min}^{-1}$ after an idling state of a machine tool at about 48 seconds before the current time. Immediately after the start, chatter vibration has occurred, and therefore the vibration level has rapidly increased up to about 60 dB. Therefore, the control-command spindle rotating speed has been changed from 2500 $\text{min}^{-1}$ to about 2878 $\text{min}^{-1}$ by an operation by the operator in accordance with the presentation by the tuning screen at about 45 seconds before the current time. As a result, the chatter vibration has converged at about 40 seconds before the current time, and machining has been continued in a state where the vibration level has reduced to about 40 dB. Machining of that block has ended about 26 seconds before the current time.

Figure 6A:
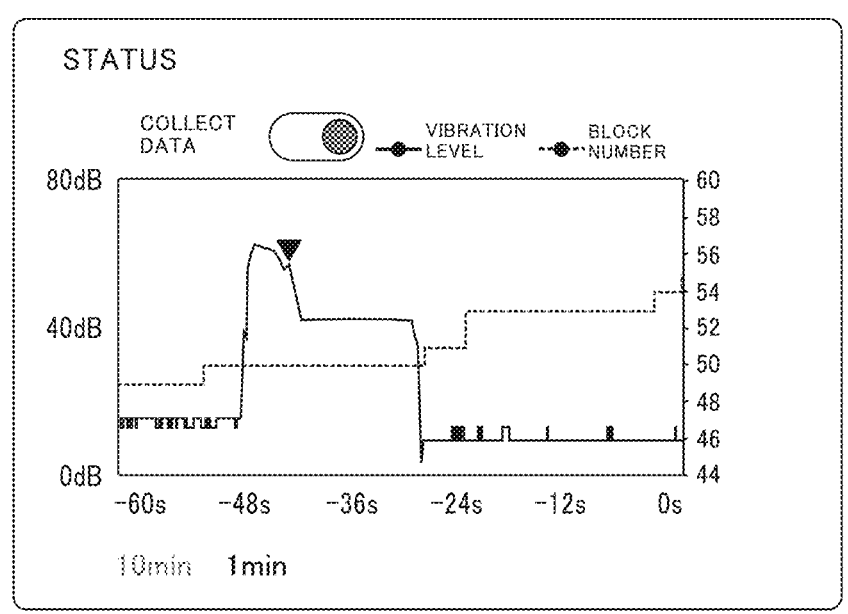
FIGS. 6A is a diagram illustrating a status screen after screen-switching.
Figure 6B:
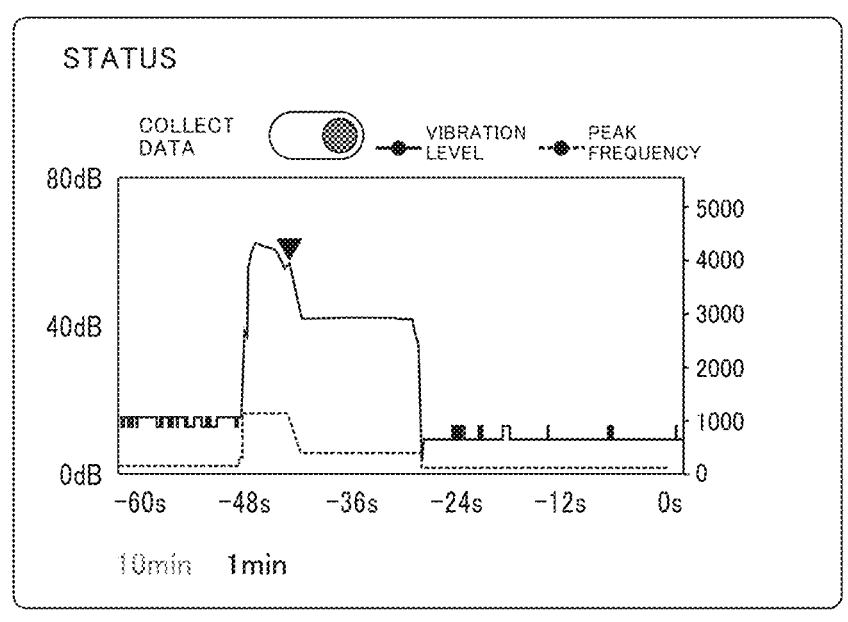
FIG. 6B is a diagram illustrating a status screen after screen-switching.

FIGS. 6A and 6B are diagrams illustrating status screens after screen-switching. FIGS. 6A and 6B illustrate a second status screen and a third status screen, respectively.

A dotted line in FIG. 6A represents a block number of a machining program. An operator can switch the screen in FIG. 5B to the second status screen in FIG. 6A by using a setting screen (not illustrated). The display control unit 158 causes the block number, which is a parameter other than a command spindle rotating speed, to be displayed as time-series data in response to a selection instruction input by an operation by the operator.

From the second status screen, a block can be ascertained in which chatter vibration has occurred and a control-command spindle rotating speed has been switched by the operator. In the illustrated example, it is found that in the 50th block in a machining program, chatter vibration has occurred and an input of an operation by the operator has been performed.

Although the control-command spindle rotating speed itself displayed on the first status screen is not displayed on this second status screen, the display of the change instruction timing of the control-command spindle rotating speed (the marker ▼) is left. Therefore, the block in which the control-command spindle rotating speed has been switched by the operator is obviously found by checking the second status screen.

A dotted line in FIG. 6B indicates a peak frequency in chronological order. The "peak frequency" means a vibration frequency at each time which provides the highest vibration level. Therefore, the peak frequency at the time of occurrence of chatter vibration represents the frequency of chatter vibration itself (also referred to as "chatter frequency").

The operator can switch the screen in FIG. 5B or FIG. 6A to the third status screen in FIG. 6B by using a setting screen (not illustrated), such as a pulldown menu. The display control unit 158 causes the peak frequency, which is still another parameter, to be displayed as time-series data in response to a selection instruction input by an operation by the operator.

From the third status screen, a peak frequency immediately before the control-command spindle rotating speed has been switched by the operator after chatter vibration has occurred, that is, the frequency as a factor of the chatter vibration can be ascertained. It is recognized that the chatter frequency is about 1200 Hz in the illustrated example.

Although the control-command spindle rotating speed itself displayed on the first status screen is not displayed also in this third status screen, the display of the change instruction timing of the control-command spindle rotating speed (the marker ▼) is left. Therefore, the peak frequency immediately before switching of the control-command spindle rotating speed by the operator, that is, the peak frequency while the chatter vibration occurs can be ascertained by checking the third status screen.

The vibration level, the control-command spindle rotating speed, the change instruction timing (the marker), and the time-series data including the block number and the peak frequency, which are displayed on the first to third status screens described above, are stored in the data storage unit 114 as control history data. Therefore, the operator can check each status screen in an ex post facto manner.

Figure 7:
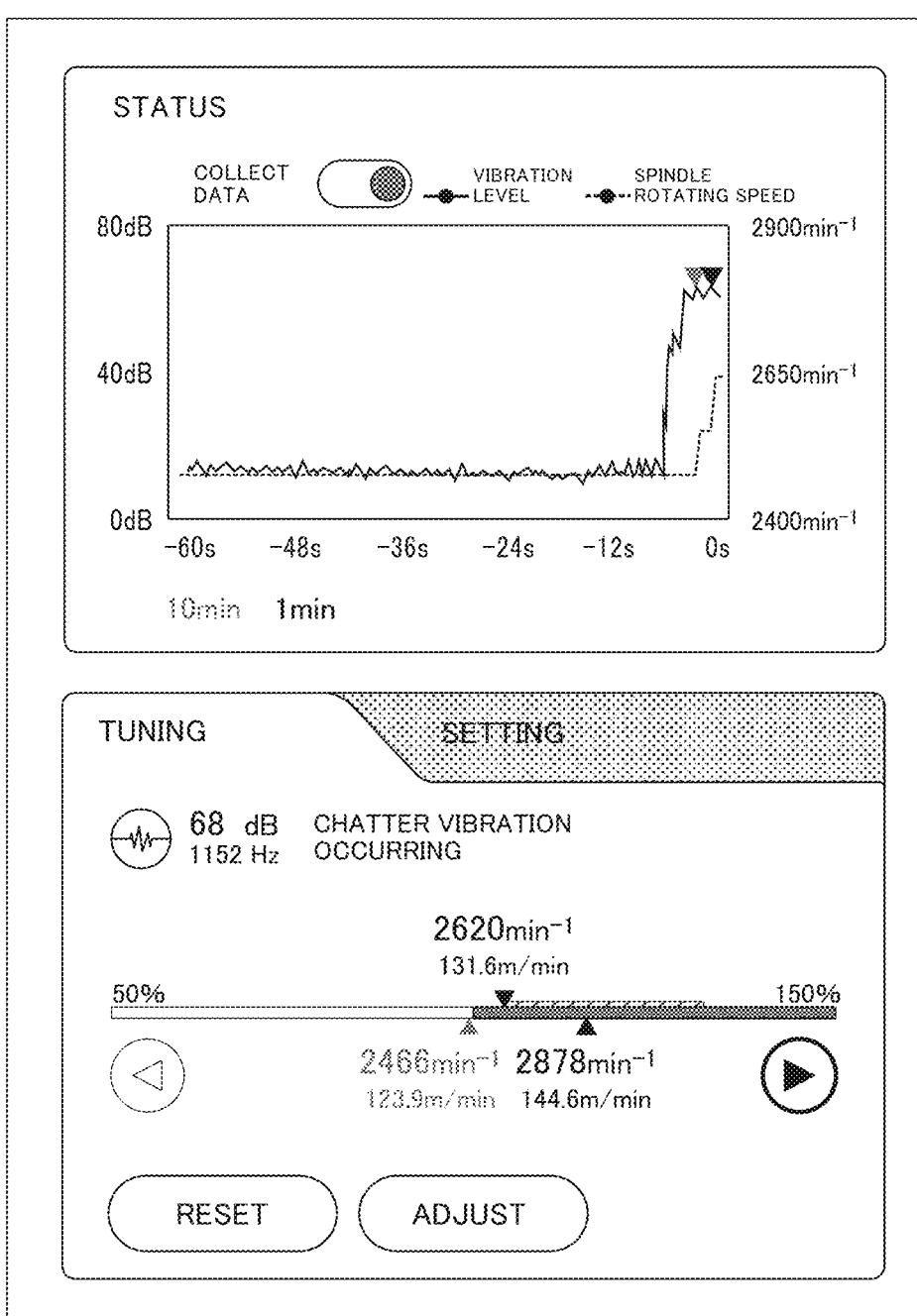
FIG. 7 is a diagram illustrating a screen example that can be displayed in the course of a vibration control process.
Figure 8:
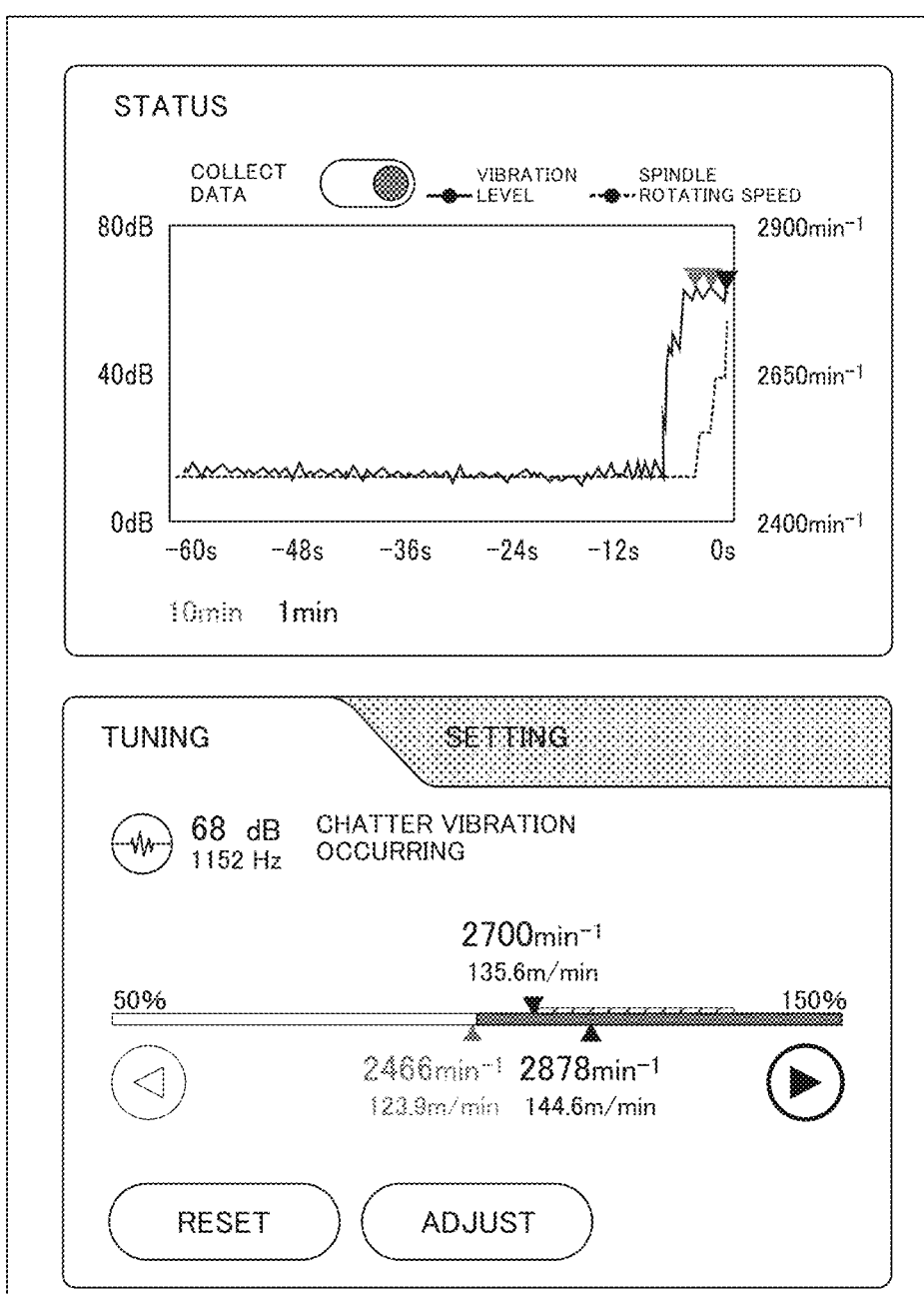
FIG. 8 is a diagram illustrating a screen example that can be displayed in the course of the vibration control process.

FIGS. 7 and 8 are diagrams illustrating screen examples that can be displayed in the course of a vibration control process.

In this example, after adjustment of a control-command spindle rotating speed by an operator has been performed twice, two markers ▼ each indicating a change timing are displayed as being superimposed on time-series data on a status screen, as illustrated in FIG. 7. Since chatter vibration has not been converged by the adjustment performed twice, third presentation of a recommended rotating speed is performed in a tuning screen.

The operator has changed the control-command spindle rotating speed in accordance with the third presentation. Therefore, as illustrated in FIG. 8, three markers ▼ each indicating the change timing are displayed as being superimposed on the time-series data on the status screen. Since the chatter vibration has not been converged by the adjustment performed three times, the fourth presentation of the recommended rotating speed is performed on the tuning screen.

As described above, when switching of the control-command spindle rotating speed is performed multiple times, the recommended rotating speed presented on the tuning screen is changed in each switching. A change in the vibration level in association with an input of an operation by the operator and a change history of the control-command spindle rotating speed are updated on the status screen from moment to moment.

Next, specific processing for suppressing chatter vibration is described.

Figure 9:
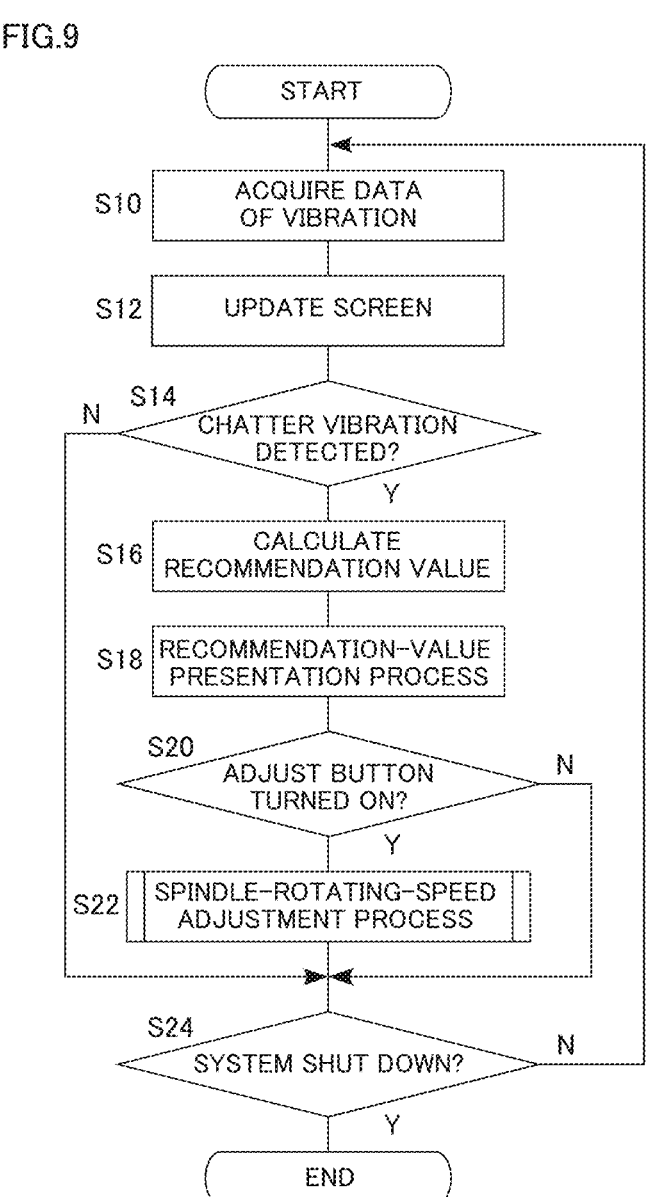
FIG. 9 is a flowchart of the vibration control process.
Figure 10:
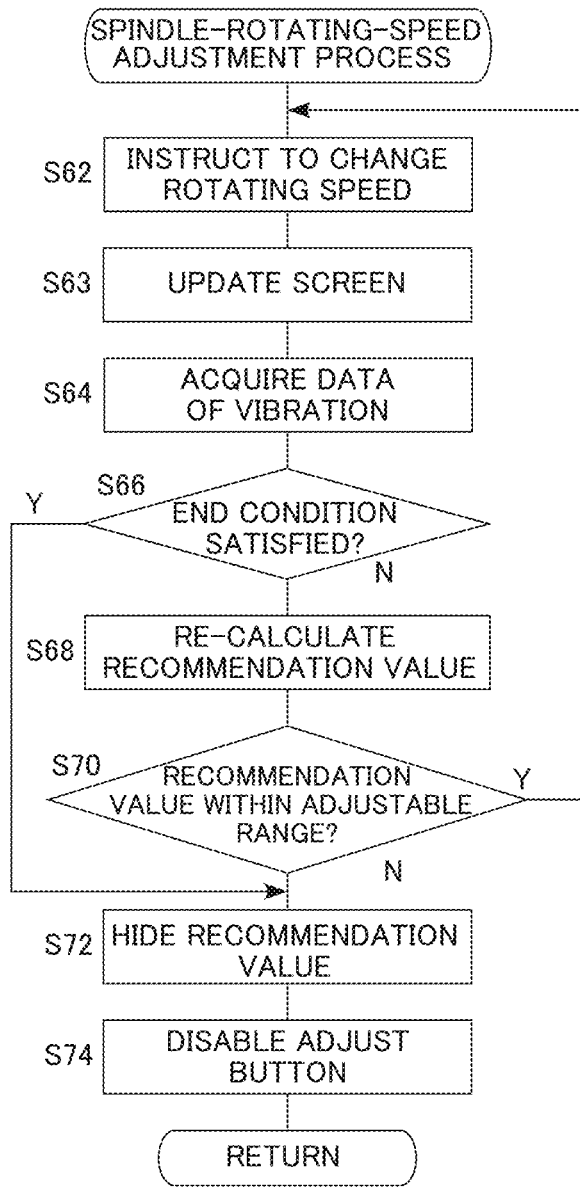
FIG. 10 is a flowchart of a spindle-rotating-speed adjustment process at S22 in FIG. 9.
Figure 11:
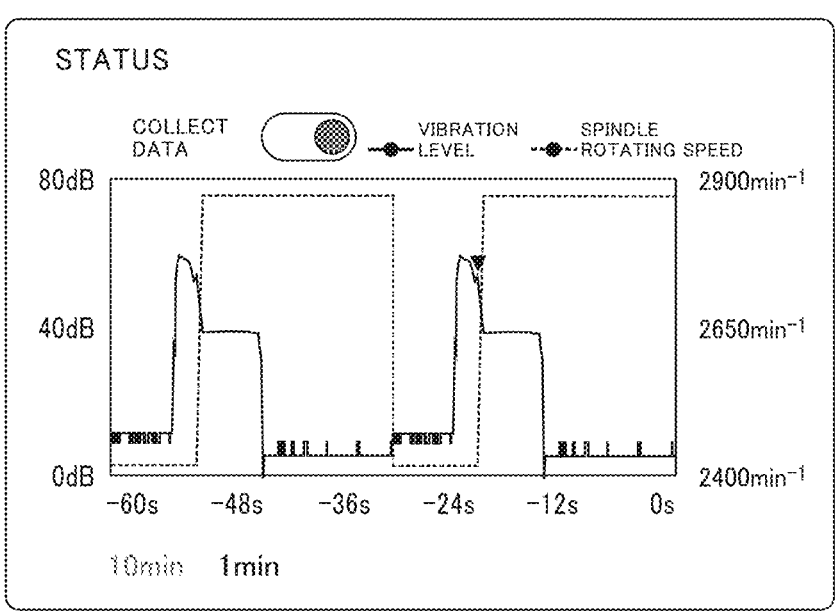
FIG. 11 is a diagram illustrating an example of a status screen that can be displayed in the course of the vibration control process.

FIG. 9 is a flowchart of a vibration control process. FIG. 10 is a flowchart of a spindle-rotating-speed adjustment process at S22 in FIG. 9. FIG. 11 is a diagram illustrating an example of a status screen that can be displayed in the course of the vibration control process.

As illustrated in FIG. 9, in the vibration control process, the vibration processing unit 154 acquires data of vibration of the spindle 18 via the detection unit 116 (S10). The display control unit 158 updates a status screen and a tuning screen on the basis of the vibration data (S12).

The status screen and the tuning screen are displayed also while no chatter vibration occurs. When a vibration level exceeds a threshold and the chatter detection unit 160 detects chatter vibration (Y at S14), the recommended-rotating-speed calculation unit 156 calculates a recommended rotating speed (S16). A recommendation-value presentation process is then performed (S18).

In this recommendation-value presentation process, the display control unit 158 causes both the first and second recommendation values that have been calculated to be displayed when both the values are within an adjustable range (within ±50% of a program-command spindle rotating speed in the present embodiment) (see FIG. 5A). In this case, a control-command spindle rotating speed is changed to the first recommendation value by tapping (selection) of the adjust button 186 by an operator.

Meanwhile, when only the selected one of the recommendation values (a selected recommendation value) is within the adjustable range, the display control unit 158 causes only the selected recommendation value to be displayed and enables the adjust button 186. Also in this case, the control-command spindle rotating speed is changed to the first recommendation value by tapping of the adjust button 186 by the operator.

When only a non-selected one of the recommendation values (a non-selected recommendation value) is within the adjustable range, the display control unit 158 causes only the non-selected recommendation value to be displayed, but disables the adjust button 186. That is, the operator cannot change the spindle rotating speed in this state. Switching the select buttons 182a and 182b to change the selected recommendation value enables the spindle rotating speed to be changed.

When both the first and second recommendation values are not within the adjustable range, the display control unit 158 hides both the recommendation values and disables the adjust button 186. The operator cannot change the spindle rotating speed in this state.

When the adjust button 186 is tapped by an input of an operation by the operator (Y at S20), the spindle-rotating-speed adjustment process is performed (S22).

As illustrated in FIG. 10, in the spindle-rotating-speed adjustment process, the vibration processing unit 154 outputs an instruction to change to the selected recommended rotating speed (S62). The numerical control unit 150 changes the control-command spindle rotating speed to that recommended rotating speed and controls the spindle 18. The display control unit 158 updates the status screen and the tuning screen (S63). At this time, symbol ▼ indicating a timing of switching of the control-command spindle rotating speed is added on the status screen, and the display position of the control-command spindle rotating speed is updated on the tuning screen. Further, the reset button 184 is enabled, so that the operator can reset control any time. The reset button 184 is enabled when the program-command spindle rotating speed and the control-command spindle rotating speed are different from each other.

The vibration processing unit 154 acquires data of vibration of the spindle 18 via the detection unit 116 (S64). When a predetermined end condition has not been satisfied (N at S66) at this time, the recommended-rotating-speed calculation unit 156 re-calculates the recommended rotating speed (S68). Examples of this "end condition" set in the present embodiment are that chatter vibration has converged, chatter vibration has become larger than before adjustment, the type of chatter vibration has been changed, and the frequency of chatter vibration has been changed. In the modification, not all these conditions but any of them may be set as the end condition. The display control unit 158 leaves the stop button 187 displayed during this re-calculation.

When the calculated recommendation value is within an adjustable range (Y at S70), the process returns to S62. When the end condition is then satisfied (Y at S66), the processes at S68 and S70 are skipped. The display control unit 158 hides the recommendation value (S72) and disables the adjust button 186 by graying out it (S74). Also when the calculated recommendation value is not within the adjustable range (N at S70), the display control unit 158 hides the recommendation value (S72), and grays out the adjust button 186 to disable it (S74).

Referring back to FIG. 9, when the adjust button 186 is not tapped (N at S20), the process at S22 is skipped. When no chatter vibration is detected (N at S14), the processes at S16 to S22 are skipped. Thereafter, when a system is shut down, for example, the operation of the machine tool 1 is stopped (Y at S24), a series of processes are ended. When the system is not shut down (N at S24), the process returns to S10.

When time-series data illustrated in FIG. 11 has been obtained in the course of the above-described process, the behavior of the vibration level in the first half and that in the second half are similar to each other. However, since a marker ▼ is displayed in the second half only, it is found that involvement of the operator is recognized in the second half only. That is, it is found that the first half is a result based on a command from a machining program and the second half is a result based on a command by an input of an operation by the operator.

The machine tool 1 has been described above on the basis of the embodiment.

According to the present embodiment, information for taking a countermeasure to chatter vibration, that is, a change in a spindle rotating speed and its change timing, a portion of a program corresponding to that change timing, and the like are automatically recorded on the machine tool 1 and displayed in a superimposing manner. Accordingly, an operator operating the machine tool 1 is saved the hassle. Since the machine tool 1 always records time-series data, data including a change timing of a control-command spindle rotating speed, details of the change, a control state at the time of the change, and the like, can be presented to the operator while those data items are completely in synchronization with each other.

Displaying a machining condition (the spindle rotating speed) as being superimposed on time-series data of a vibration level enables the operator to easily check the machining condition changed by oneself. Further, in a case where the spindle rotating speed has changed multiple times, a machining condition that is the most effective to suppress chatter vibration can be easily checked.

Further, by displaying a point (a marker) of changing the machining condition (the spindle rotating speed) and a peak frequency as being superimposed on the time-series data of the vibration level, a chatter frequency can be easily identified. A position at which the chatter vibration has occurred can also be identified by using the technology described in Patent Literature 1 together. Therefore, even in a case where the chatter vibration has not been caused to converge only by changing the control-command spindle rotating speed, it can be easily determined which one of a tool, a tool holder, and a method of fixing a workpiece is to be changed.

Furthermore, a portion of a program can be easily identified by displaying the point (the marker) of changing the machining condition (the spindle rotating speed) and a block number of the program as being superimposed on the time-series data of the vibration level. In addition, a portion of a block at which chatter vibration becomes especially large can be easily identified. Even when display of the spindle rotating speed is turned off, the change point can be easily ascertained by displaying the marker.

In addition, when chatter vibration has occurred, a recommended change value (a recommended rotating speed) of the control-command spindle rotating speed for causing the chatter vibration to converge is calculated in the machine tool internally, and the operator has only to determine whether to approve the recommendation. Therefore, the operator can easily take a quick response. Even an operator who is inex-perienced and does not have intuition can take an action easily. The present embodiment can provide an easy-to-use display screen for the operator when an operation for suppressing chatter vibration in the machine tool 1 is prompted.

<Modification>

Figure 12:
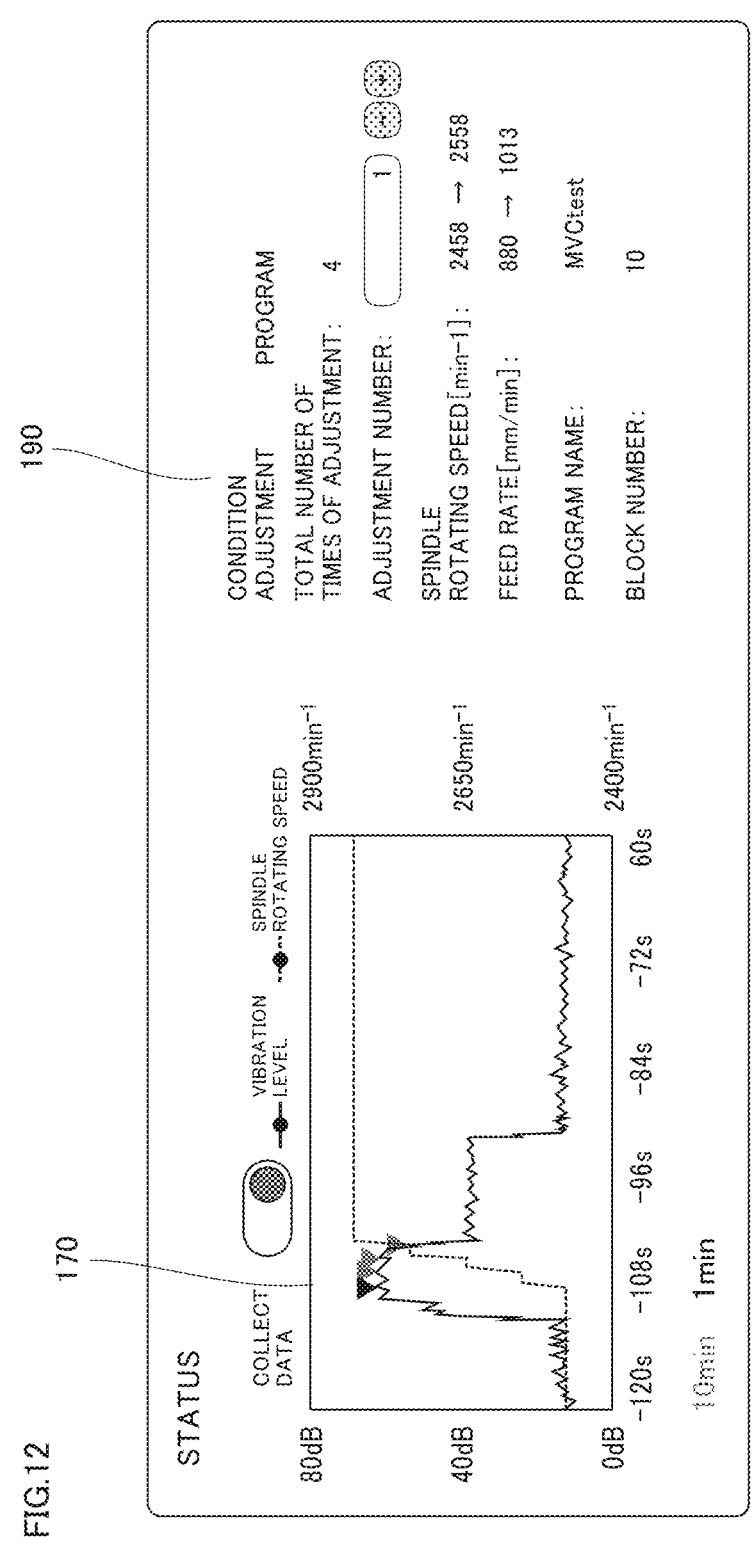
FIG. 12 is a diagram illustrating a status screen according to a modification.

FIG. 12 is a diagram illustrating a status screen according to a modification.

In the present modification, a change applying screen 190 on which change contents in a machining condition are indicated as a numerical value is included in the status screen, together with the sampling screen 170. The display control unit 158 causes this change applying screen 190 to be displayed, on the basis of an operation by an operator. In the illustrated example, adjustment of a control-command spindle rotating speed by the operator has been performed four times, and four markers ▼ each indicating a change timing are displayed as being superimposed on time-series data.

A total number of times of adjustment, an adjustment number, a change in a spindle rotating speed, a change in a feed rate, a program name, and a program row (a block number) are displayed on the change applying screen 190. The "total number of times of adjustment" indicates the number of changes of a control command value for causing chatter vibration to converge.

The "adjustment number" indicates the number of adjustment the operator wants to check, and can be optionally selected in a case where the spindle rotating speed has been changed multiple times. Any number selected from 1 to 4 indicated by the four markers ▼ can be input in the illustrated example. That is, the display control unit 158 causes the markers to be displayed as input objects receiving a selection input by the operator and, when any of the markers is selected, causes the changes associated with the selected marker to be displayed as the change applying screen 190. The operator can identify the adjustment number by increasing or decreasing it with a + button or a − button. In this example, since the adjustment number 1 has been selected, the associated marker is displayed as being active, and the other markers are grayed out.

As a result, the change applying screen 190 displays the following by the first adjustment, that is, "the control-command spindle rotating speed has been changed from $2458 \text{ min}^{-1}$ to $2558 \text{ min}^{-1}$", "the feed rate has been changed from 880 mm/min to 1013 mm/min", "these changes have been made in the block with the block number 10", and the like. In the example illustrated in FIG. 12, chatter vibration has not been converged by the first adjustment, but has been caused to converge by the fourth adjustment. Therefore, a command spindle rotating speed that has caused the chatter vibration to converge can be checked by specifying 4 as the adjustment number.

According to the present modification, by displaying the change applying screen 190 after machining, a machining condition applied when chatter vibration has occurred and a change of vibration can be clearly checked as numerical values in an ex-post facto manner.

A control-command spindle rotating speed has been described as an example of a control command value in the above-described embodiment. A command value of a spindle feed rate (a command feed rate) may be included in time-series data in addition to or instead of the control-command spindle rotating speed. Such time-series data makes it possible to ascertain which one of the spindle rotating speed and the spindle feed rate is the major factor of chatter vibration.

In the above-described embodiment, an example has been described in which another parameter, such as a block number or a peak frequency, is displayed in time-series data as the second or third status screen while display of a command spindle rotating speed is turned off. In the modification, the another parameter may be displayed in a superimposing manner while display of the control-command spindle rotating speed is maintained.

In the above-described embodiment, an example has been described in which an adjustable range of a spindle rotating speed is set to a range from 50% to 150% (that is, within ±50%) of a control-command spindle rotating speed, as illustrated in FIG. 8. In the modification, setting of the adjustable range can be changed by determination made by an operator.

For example, the operator may be able to set the adjustable range to a range from 50% to 150% (that is, within ±50%) or a range from 80% to 120% (that is, within ±20%). Further, it is also allowable that the adjustable ratio (%) on the plus side and the adjustable ratio (%) on the minus side can be made to be different from each other with respect to the control-command spindle rotating speed. For example, appropriate setting, in which the adjustable range on the minus side that is a relatively safe side is set to be larger can be performed. Such setting can be performed by switching a tuning screen to a setting screen. Such setting allows an upper limit and a lower limit of the adjustable range to be set by determination by the operator, thus enabling an operation fitting to the sense of each operator.

In the above-described embodiment, an example has been described in which a tuning screen is displayed and, when chatter vibration has occurred, a recommended change value of a spindle rotating speed is calculated in a machine tool internally. In the modification, an operator may make a change on the basis of one's own sense. In this case, the tuning screen may be omitted. Specific examples of this case include a case where the operator has manually operated an override switch provided on a console of a machine tool to change a control command value. In this case, information on a response to the chatter vibration is automatically recorded on the machine tool and is displayed in a superimposing manner, thereby allowing the operator to reflect the information on subsequent countermeasures to chatter vibration.

In the above-described embodiment, an example has been described in which a current control-command spindle rotating speed is displayed above the override bar 180. In the modification, an actual spindle rotating speed may be displayed in place of the current control-command spindle rotating speed. This is because the current control-command spindle rotating speed is approximately equal to the actual spindle rotating speed. In this case, the "actual spindle rotating speed" corresponds to the "second rotating speed". The recommended-rotating-speed calculation unit 156 calculates the first recommendation value higher than the actual spindle rotating speed and the second recommendation value lower than the actual spindle rotating speed as recommended rotating speeds to be presented to the operator.

In the above-described embodiment, a horizontal machining center has been described as an example of the machine tool 1. The machine tool 1 may be a vertical machining center in the modification. Alternatively, the machine tool 1 may be a turning center or a combined machine having both the functions of the machining center and the turning center. The above-described display control for suppressing chatter vibration may be applied to these machine tools.

The present invention is not limited to the embodiments described above and modifications thereof, and any component thereof can be modified and embodied without departing from the scope of the invention. Components described in the embodiments and modifications can be combined as appropriate to form various embodiments. Some components may be omitted from the components presented in the embodiments and modifications.

This application claims priority from Japanese Patent Application No. 2021-106226 filed on Jun. 28, 2021, the entire contents of which are hereby incorporated by reference herein.

The invention claimed is:

1. A display control device comprising:
a memory storing various programs and set data; and
a processor controlling display of a state of a machine tool
   wherein the machine tool includes (i) an attachment portion to which a tool is attachable, and (ii) the processor controlling (a) movement of the attachment portion and (b) a rotating speed of the tool in accordance with a machining program and detecting vibration of the tool,
wherein the processor controls display of time-series data indicating (i) a change in a vibration level detected by the processor and (ii) a change in the rotating speed of the tool,
wherein upon receiving an instruction to change the rotating speed, the processor controls to display a marker indicating a timing of the change instruction so that the marker is superimposed on the time-series data.

2. The display control device according to claim 1, wherein in response to a selection instruction input by an operation of an operator, the processor displays a change in another parameter as the time-series data in addition to or instead of the change in the rotating speed of the tool.

3. The display control device according to claim 2, wherein the parameter to be selected includes at least one of a block number in the machining program and a peak frequency at which the vibration level is highest.

4. The display control device according to claim 1, wherein the processor displays a change applying screen in which a change in response to the change instruction is displayed as a numerical value.

5. The display control device according to claim 4,
wherein the processor displays the marker as an input object to receive a selection input by an operator,
when a marker is selected, the processor displays, as the change applying screen, a change associated with the selected marker.

6. A machine tool comprising:
an attachment portion to which a tool is attachable;
a memory storing various programs and set data; and
a processor including an input unit, a numerical control unit, a vibration detection unit, and a display control unit,
wherein the input unit receives input of an operation of an operator;
the numerical control unit controls movement of the attachment portion and a rotating speed of the tool in accordance with a machining program;
a vibration detection unit detects vibration of the tool; and
a display control unit controls display of time-series data indicating a change in a vibration level detected by the vibration detection unit and a change in the rotating speed of the tool,
wherein upon receiving an instruction to change the rotating speed from the input unit, the display control unit displays a marker indicating a timing of the change instruction so that the marker is superimposed on the time-series data.

* * * * *